Sept. 15, 1942.  R. B. COTTRELL  2,295,547
STABILIZING DEVICE
Filed July 25, 1940  2 Sheets-Sheet 1

INVENTOR.
Robert B. Cottrell,
BY
atty.

Sept. 15, 1942.                R. B. COTTRELL                2,295,547
                              STABILIZING DEVICE
                    Filed July 25, 1940          2 Sheets-Sheet 2
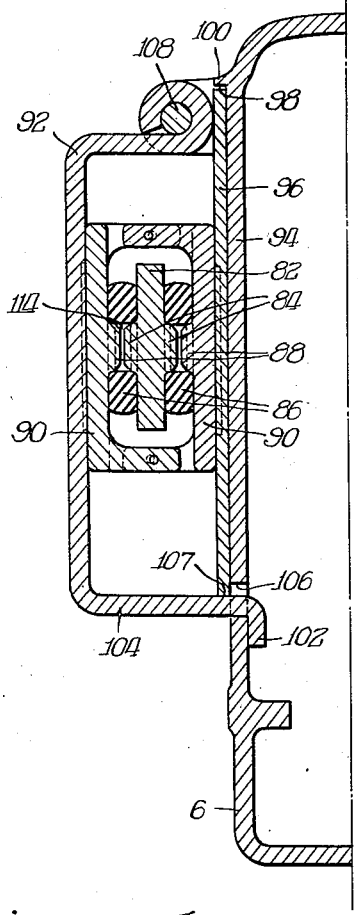
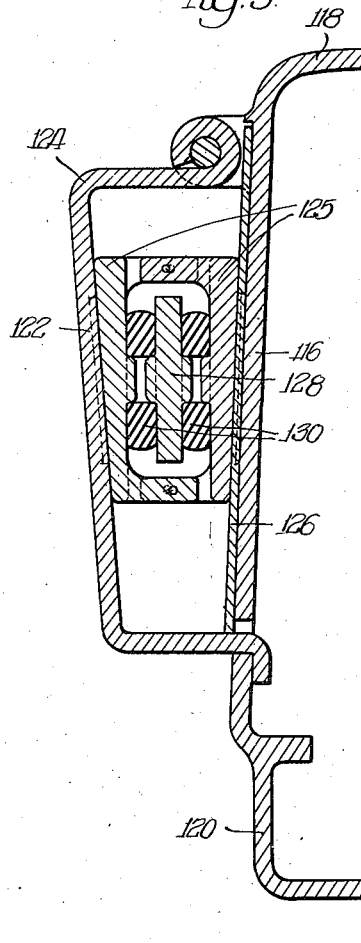
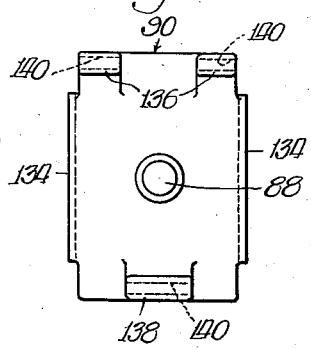
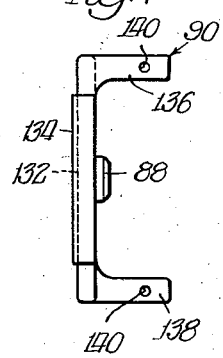
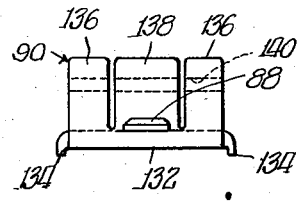
INVENTOR.
Robert B. Cottrell, Patented Sept. 15, 1942

2,295,547

UNITED STATES PATENT OFFICE 2,295,547

STABILIZING DEVICE

Robert B. Cottrell, Chicago, Ill., assignor to American Steel Foundries, Chicago, Ill., a corporation of New Jersey Application July 25, 1940, Serial No. 347,453

34 Claims. (Cl. 105—197.2)

My invention relates to a four wheel railway car truck, and more particularly to such a type of truck commonly designated spring plankless quick wheel change, wherein the spring plankless, quick wheel change comprises spaced side frames and a connecting bolster wherein the bolster serves as tying and squaring means between the said side frames.

My invention comprises an improvement for a well-known type of truck, the general form of which is shown and described in my Patent No. 2,188,641, issued January 30, 1940. The said type of truck comprises spaced side frames, a bolster or load carrying member extending therebetween, and an insert member at each end of the bolster acting as additional tying means between the bolster and the adjacent side frame columns. In such an arrangement, the bolster, of course, serves as a squaring means and the form of engagement of the ends of the bolster with the side frames is important in determining the stability of the connection between the side frames and the opposite sides of the truck.

An object of my invention is to get added stability from such a truck structure as that described by a special form of connection between the bolster and each side frame, and in the modification shown, the special feature is made a part of the before mentioned insert member at each side of the truck. The general object of my invention is to afford a stabilizing arrangement for a quick wheel change spring plankless four wheel car truck by affording means offering resilient resistance to any out-of-square movement between the side frames at opposite sides of the truck and the bolster or load carrying member which extends therebetween.

My invention contemplates such an arrangement as that described wherein all parts are especially designed to facilitate the manufacturing process and to accommodate the most practicable and inexpensive foundry methods.

My invention further comprehends a novel form of tying or interlocking means between the spaced side frames of a four wheel car truck, and the bolster or load carrying member extending therebetween, said interlocking means being in the form of a single casting at each side of the truck, said casting being partly recessed in the bottom wall of the bolster and afforded a seat upon the spring group which supports the bolster, and my said novel interlocking casting includes an arrangement for connecting said casting to the side frame columns or thereadjacent at opposite sides of the bolster opening, and contemplates such a connection between said casting and said columns as will offer resilient resistance to any out-of-square movements between the side frame and bolster.

Still another object of my invention is a novel form of connection between the side frame and bolster of a four wheel car truck, said connection comprising an interlocking member between an end of the bolster and the side frame with said interlocking member afforded frictional engagement at its opposite ends with said side frame in such manner as to offer resistance to such movements of said member as might be occasioned by operation of a truck under service conditions.

A still further object of my invention contemplates the introduction of frictional resistance between the bolster and side frame to prevent synchronous oscillation of the spring or suspension system.

Another object of my invention is to provide a friction device in a car truck that will prevent synchronous oscillation of the suspension system and which is so arranged that small movements of the bolster on the suspension system are not affected.

In the drawings,

Figure 4 is a sectional view taken in the vertical transverse plane substantially as indicated by the line 4—4 of Figure 1, said section being taken through the connection of the insert or interlocking member with the side frame column.

Figure 5 is a sectional view comparable to that of Figure 4 showing a different form of arrangement for said connection.

Figures 6, 7, and 8 show the form of friction shoe used in my novel connection, Figure 6 being a plan view thereof taken from the right as seen in Figure 7. Figure 7 is a side elevation thereof, and Figure 8 an end view.

Figure 1:
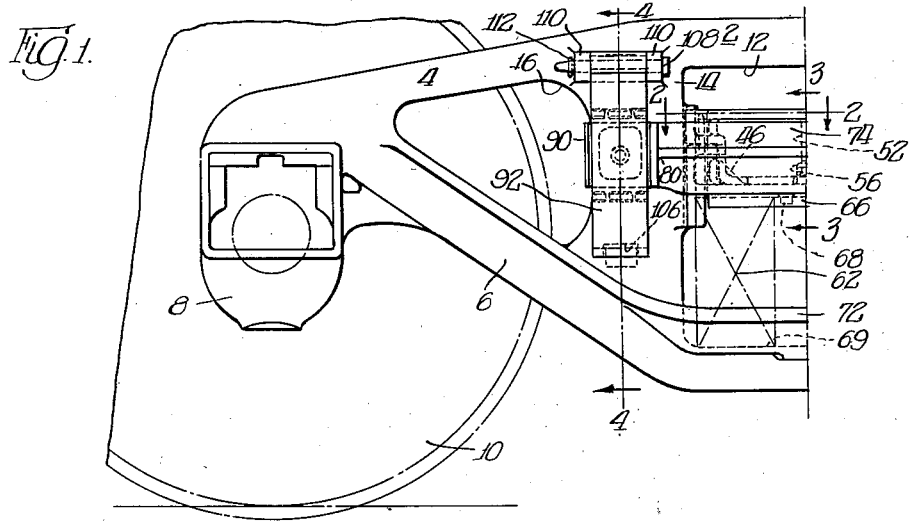
Figure 1 is a side elevation of a car truck embodying my invention, only one-half of the truck structure being shown inasmuch as the structure is the same at opposite ends thereof.
Figure 2:
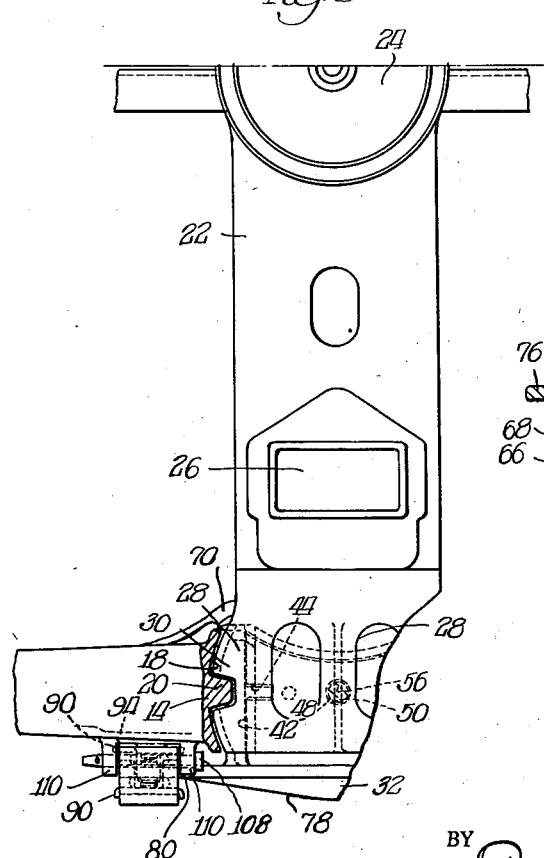
Figure 2 is a top plan view of the truck structure shown in Figure 1, partly in section, the section being taken substantially in the horizontal plane indicated by the line 2—2 of Figure 1.
Figure 3:
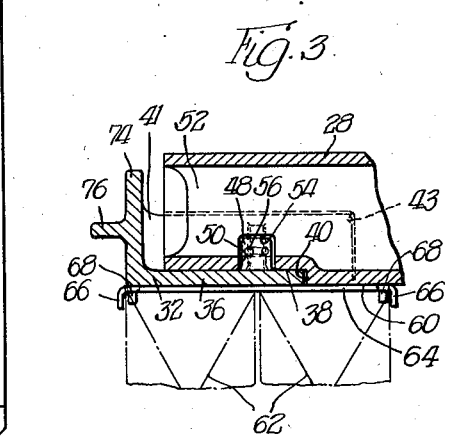
Figure 3 is a fragmentary sectional view taken in the transverse vertical plane bisecting the truck as indicated by the line 3—3 of Figure 1.

Describing my novel truck arrangement in greater detail, it comprises the side frame 2 having the compression member 4 and the tension member 6 merging adjacent their ends with the journal box 8 forming the usual means of connection with the wheel and axle assembly 10. The side frame has at each side of the central bolster opening 12 an integral column 14 of novel form, and outwardly of each column is formed a window opening 16. Each column has a bolster guide surface of well-known form comprising an arcuate surface 18 interrupted centrally thereof by the vertical column 20, said guide surface being located centrally on the column and spaced from the compression member above the window opening as well as from the tension member therebelow. The bolster 22 is afforded the usual center bearing 24 and side bearing 26, and has an end portion 28 projecting into the bolster opening 12, and the top portion of said bolster end 28 is widened to form lateral shelves 30, 30 in the manner more particularly described in my before mentioned Patent No. 2,188,641. On each shelf 30 is formed a guide surface complementary to that of the column surface already described. There is also afforded an insert or interlocking casting 32 of novel form and comprising a bottom web 36 which is recessed as at 38 in the bottom wall of the bolster and afforded abutment thereagainst at its inboard edge as at 40 (Figure 3) along its arcuate inboard edge, the configuration of which is best seen in the view of Figure 2. The interlocking member is afforded at each end an upstanding column guide portion 41 having flat face engagement as at 42 (Figure 2) with the lateral walls of the bolster, said lateral walls being slightly recessed as at 43 to accommodate said column guide portion, cored out as at 44 to accommodate the rib 46 affording a reinforcing means for the upstanding end portion of the interlocking member as well as means of positioning said interlocking member with respect to the bolster. Further positioning means is afforded in the central upstanding lug 48 projecting through the opening 50 afforded therefor in the bottom wall of the bolster (Figure 3), said lug 48 extending upwardly into the central rib 52 of the bolster end which is cored out as at 54 for that purpose. The lug 48 is afforded an opening 56 in which may be positioned a bolt or cotter key as added safety means preventing accidental dismantling of the bolster and insert.

The bottom of the insert web 36 is co-planar with the bottom surface 60 (Figure 3) of the bolster, and said insert and bolster end are seated upon the spring group diagrammatically shown at 62, said spring group comprising the top plate 64 with downturned inboard and outboard flanges 66, 66, said bolster end being interlocked with said top plate as at 68, 68. The spring group 62 is afforded a seat as at 69 on the tension member of the side frame beneath the window opening 12, said tension member being widened therebelow to form said spring seat, and being afforded upturned inboard and outboard flanges designated respectively 70 and 72, said flanges thus forming between spaced columns 14, 14 a well-like cavity within which the spring group may be seated and retained against possible accidental loss. The form of the tension member at its juncture with the columns is similar to that particularly described in my before mentioned Patent No. 2,188,641.

The insert or interlocking member 32 is afforded an outboard vertical wall 74 reinforced by the horizontal rib 76 having a relatively great depth at its central portion, and tapering away therefrom as at 78 to merge at either end as at 80 with the wall 74. At each end of the interlocking casting 32, the vertical wall 74 is extended outboard the adjacent column in rectangular plate-like end portions or wing members 82 (Figure 4) on the opposite faces of which are formed the central lugs 84, 84 as a means of positioning the resilient members or rubber pads 86, 86, the opposite faces of said rubber pads being positioned by the lugs 88, 88 formed on the inwardly directed face of the inboard and outboard friction shoes 90, 90, said shoes being identical in form and reversible as more particularly described hereinafter. The shoes 90, 90 adjacent each column are confined between the housing 92 and the opposite face of the adjacent column wall 94. The said column wall is afforded a wear plate 96 having abutment as at 98 against the lug 100 formed on the wall 94. The housing is formed with a downturned flange 102 at the inboard extremity of its bottom wall 104, said flange 102 being received within the slot 106 formed in the column wall 94 for that purpose. The bottom edge of the wear plate 96 has a seat as at 107 on the wall 104 of the housing. In assembly, the lug or flange 102 of the housing 92 may be inserted in the slot 106, the wear plate placed against the face of the column, the inner resilient member 86 and inner shoe 90 positioned between the wall 94 and the plate member 82, the outer resilient pad 86 and outer shoe 90 positioned with respect to plate member 82, and the housing 92 rotated into position about the fulcrum 102 where it may be secured by means of the retaining pin 108, opposite ends of which are received in aligned openings in the lugs 110, 110 integrally formed on the outer face of the compression member 4 at the top of the column. Said pin 108 may be locked in position by the cotter key 112 or otherwise secured in any convenient manner. As the housing 92 is forced into position, the rubber pads 86, 86 are compressed and the shoes 90, 90 are brought tightly into engagement between the wear plate 96 and the inner wall of the housing 92. The compression of the rubber pads 86, 86 is controlled by the clearance between opposing lugs 84, 88 as at 114. These lugs and the amount of clearance afforded also determines the out-of-squareness of the truck.

The modification shown in Figure 5 differs from that which is described in that the outer wall 116 of the column extending between the compression member 118 and the tension member 120 is arranged on a diagonal, and the outer wall 122 of the housing 124 is likewise diagonally arranged so that the opposite walls 116, and 122 are flared with respect to each other, and the shoes 125, 125 are constructed with walls thicker at the top to afford a convenient seat against the wear plate 126 and the wall 122, said shoes otherwise conforming in detail to those before mentioned. In this arrangement, each end plate member 128 of the insert or interlocking casting is likewise confined between the inboard and outboard resilient members 130, 130, and positioned with respect thereto, said resilient members 130, 130 also being positioned with respect to shoes 125, 125 between which they are confined.

The form of each shoe 90 is shown in detail in Figures 6, 7, and 8. It will be noted that each shoe is a plate-like structure formed with a flat friction surface 132, and confined at opposite lateral edges by the vertical flanges 134, 134. At one end of the shoe are formed the inturned spaced lugs 136, 136, and at the opposite end of the shoe is formed an intermediate lug 138, said spaced and intermediate lugs being so positioned that the shoes may be interlocked with each other by means of said lugs in the manner shown in the assembly views. By this arrangement, the shoes in the modification shown in Figure 4 may be positioned with either end up without affecting the operation of the device while in the modification shown in Figure 5, the shoes would necessarily be assembled with the thicker portions up. Each of the lugs 136 and 138 is afforded an opening 140 extending transversely of the shoe. In assembly, the resilient pads and shoes may be assembled on the plate-like ends or members 82 of the interlocking casting, said shoes being placed under compression with the resilient pads between them until the openings 140, 140 are brought into alignment. Securing pins may be placed in said pin openings to remain in position until the housing 92 has been assembled and the housing securing pin secured, at which time the shoes may be released by removing the pins from the aligned openings 140, 140 leaving said shoes free to move as desired in operation.

To those experienced in the art, it will be apparent that my novel arrangement affords increased stability for the truck structure inasmuch as the projecting ends of the interlocking casting are restrained against vertical or lateral movement by the resilient connection thereof to the outboard face of the adjoining columns. The friction developed by the confined friction shoes may be controlled as desired by modifying the character of the diverging surface between which they may be confined, as well as by altering the composition and arrangement of the resilient means compressed between the shoes and the plate ends of the interlocking casting. By this arrangement I have improved the operating qualities of a spring plankless quick wheel change truck by providing an additional means of resiliently mounting the truck parts in normal squared relationship. It may be noted that the resilient connection between the lateral arms of the interlocking member 82 and the friction shoes permits some degree of movement of said arms without affecting the position of the friction shoes. Any large vertical up or down movement, however, will be transmitted through said resilient pads from said interlocking member arms or end portions to the friction shoes, and thus said shoes will have vertical movement along the friction surfaces between which they are confined. Any such vertical movement, either up or down, will be limited by engagement of the arm or end portion 82 of the interlocking member with the adjacent lugs 136 and 138 of the friction shoes, said lugs both overlying and underlying the member 82 for that purpose as best seen in views of Figures 4 and 5. In the modification of Figure 5, the friction surfaces are divergently arranged with respect to each other so that greater friction is developed as the parts move downwardly than when they move upwardly as load is released. It will be clear to those skilled in the art that all movements of the interlocking member will be somewhat restricted by the novel means of connecting the end arms thereof to the adjacent columns, while at the same time this part is permitted to function in its normal manner as means of interlocking together the side frame and bolster.

It is also apparent that the rubber pads restrain out-of-squareness of the truck, as in order for the bolster to angle with respect to the side frame, the wings on the insert casting must compress these pads. A limited amount of movement is afforded by this construction, which amount is controlled by the clearance between the lugs 84 and 86. Any excessive out-of-squareness will be prevented by these lugs coming in contact with each other.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a four wheel railway car truck, a side frame having tension and compression members and spaced columns defining a central bolster opening, a bolster end extending in said opening and having a widened top portion forming lateral shelves, an interlocking member associated with said side frame and bolster and comprising a horizontal web recessed in the bottom wall of said bolster, and a vertical web having end portions extending outboard said columns, a friction surface on each of said columns, a friction shoe seated against said surface, and a resilient connection between said friction shoe and the adjacent end portion of said interlocking member.

2. In a railway car truck, a truss side frame having tension and compression members and spaced columns forming a bolster opening, said tension member being widened beneath said bolster opening and formed with upstanding flanges defining a spring seat, a spring group thereon, a bolster end extending into said opening and having a widened portion formed with guide surfaces for cooperating with complementary guide faces on said columns, an interlocking member associated with said bolster and side frame and comprising a horizontal web recessed in the bottom wall of said bolster, and upstanding end portions interlocked with said side frame columns, said bolster and interlocking member being seated on said spring group, spaced friction surfaces afforded on each of said columns at opposite sides of said opening, end portions on said interlocking member extending between the friction surfaces at opposite sides of the opening, and friction shoes resiliently supported on said end portions for engagement with said surfaces.

3. In a railway car truck, a side frame having top and bottom member and spaced columns defining a bolster opening, a bolster end extending into said opening, a spring group seated on said bottom member in said opening, an interlocking member associated with said bolster and side frame, said interlocking member and said bolster being seated on said spring group and having similar guide surfaces associated with complementary guide surfaces on said columns, a friction surface on each column, a friction shoe seated thereagainst, end portions on said interlocking member extending along said columns adjacent said shoes, and a resilient connection between each end portion and the adjacent shoe.

4. In a railway car truck, a side frame having spaced columns and an intervening bolster opening, a bolster projecting into said opening, an interlocking member associated with said bolster and said frame and comprising a vertical web with end portions extending outboard said columns, spaced friction surfaces supported on each of said columns around the adjacent end portion, friction shoes interposed between each end portion and the adjacent friction surfaces, and resilient means under compression between said end portions and the adjacent shoes.

5. In a railway car truck, a side frame having top and bottom members and spaced columns forming a bolster opening, a spring group on said bottom member in said opening, a bolster end extending into said opening, an interlocking member affording a means of connection between said bolster and side frame, said interlocking member and said bolster being seated on said spring group and having similar guide surfaces cooperating with complementary guide surfaces on said columns, said interlocking member comprising a vertical web with end portions extending along the outer face of each column, spaced friction surfaces supported on said columns on opposite sides of each end portion, and friction shoes resiliently connected to said end portions for actuation thereof against said friction surfaces.

6. In a railway car truck, a side frame having top and bottom members and spaced columns forming a bolster opening, a spring group on said bottom member in said opening, a bolster end extending into said opening, an interlocking member associated with said side frame and bolster, said interlocking member and bolster end being seated on said spring group and said interlocking member comprising end portions extending outboard said columns, friction surfaces on said columns adjacent said end portions, friction shoes seated against said surfaces, and a resilient connection between each of said end portions and the adjacent shoes operable to actuate said shoes in movement of said end portions.

7. In a railway car truck, a side frame having top and bottom members and spaced columns defining a bolster opening, a spring group on said bottom member in said opening, a bolster end extending into said opening, an interlocking member associated with said side frame and bolster and comprising a horizontal web recessed in the bottom wall of said bolster, said interlocking member and said bolster being seated on said spring group, said interlocking member and said bolster having similar column guide surfaces cooperating with complementary surfaces of said columns and said interlocking member having end portions extending outboard said columns, spaced friction surfaces supported on each of said columns, friction shoes seated thereagainst, and a resilient connection between each end portion and the adjacent friction shoes.

8. In a railway car truck, a side frame having top and bottom members and spaced columns defining a bolster opening, a spring group on said bottom member in said opening, a bolster end extending into said opening, an interlocking member associated with said side frame and bolster and comprising a horizontal web recessed in the bottom wall of said bolster, said interlocking member and said bolster being seated on said spring group, said interlocking member and said bolster having similar column guide surfaces cooperating with complementary surfaces of said columns, and said interlocking member having end portions extending outboard said columns, spaced friction surfaces supported on each of said columns, friction shoes seated thereagainst, and a resilient connection between each end portion and the adjacent friction shoes, said resilient connection comprising a rubber pad under compression between each shoe and the adjacent side of said end portion.

9. In a railway car truck, a frame having top and bottom members and spaced columns defining a bolster opening, a spring group on said bottom member in said opening, a bolster end extending into said opening, an interlocking member associated with said side frame and bolster and comprising end portions, said interlocking member and said bolster being seated on said spring group, spaced friction surfaces supported on each of said columns, friction shoes seated thereagainst, a resilient connection between each end portion and the adjacent friction shoes, said resilient connection comprising a rubber pad under compression between each shoe and the adjacent side of said end portion, and stop means on said shoes and said end portions effective to limit the compression of said pads.

10. In a railway car truck, a side frame having top and bottom members and spaced columns defining a bolster opening, a spring group on said bottom member in said opening, a bolster end extending into said opening, an interlocking member associated with said side frame and bolster and comprising end portions, said interlocking member and said bolster being seated on said spring group, spaced friction surfaces supported on each of said columns, friction shoes seated thereagainst, and a resilient connection between each end portion and the adjacent friction shoes, said resilient connection comprising a rubber pad under compression between each shoe and the adjacent side of said end portion.

11. In a railway car truck, a side frame having spaced columns and an intervening bolster opening, a bolster extending into said opening, and an interlocking member associated with said side frame and bolster, said interlocking member and bolster having similar guide surfaces engaging complementary surfaces on said columns, and said interlocking member having wing portions extending along said columns, spaced friction surfaces supported on each column, friction shoes engaging said surfaces, and resilient pads compressed between each wing portion and the adjacent friction shoes, said resilient pads affording means of transmitting movement from said wing portions to said friction shoes.

12. In a railway car truck, a side frame having spaced columns and an intervening bolster opening, a bolster extending into said opening, and an interlocking member associated with said side frame and bolster, said interlocking member and bolster having similar guide surfaces engaging complementary surfaces on said columns, and said interlocking member having wing portions extending along said columns, spaced diverging friction surfaces supported on each of said columns, friction shoes seated against said surfaces, and resilient means interposed between each wing portion and the adjacent shoes.

13. In a railway car truck, a side frame having spaced columns at opposite sides of a bolster opening, a bolster end extending into said opening, a spring group on said frame in said opening, a member secured between said spring group and said bolster for movement therewith and comprising wing portions adjacent said columns, opposed friction surfaces on each column, friction shoes seated thereagainst, and a resilient connection between each friction shoe and the adjacent wing portion whereby the friction shoes may be actuated through said resilient connections by movement of said first mentioned member in normal operation of said truck.

14. In a railway car truck, a side frame having a top member, a bottom member, and spaced columns defining a bolster opening, spring means on said bottom member, a bolster having an end supported on said spring means, friction devices outboard said columns, and a rigid member fixed in relation to said bolster with end portions extending along said columns for actuation of said friction devices.

15. In a railway car truck, a side frame having a compression member, a tension member, and spaced columns defining a bolster opening, a spring group on said tension member in said opening, a bolster end supported on said spring group, friction devices mounted outboard said columns, and a rigid member fixed with respect to said bolster end and interlocked with said columns, said rigid member having end portions extending outboard said columns for actuation of said devices.

16. In a railway car truck, a side frame having spaced columns and an intervening bolster opening, a bolster extending into said opening, and an interlocking member associated with said side frame and bolster, said interlocking member having wing portions extending along said columns, a plurality of opposed friction surfaces on each column, friction shoes in engagement with said surfaces, and resilient means compressed between said wing portions and the adjacent shoes and operable to urge said shoes against said surfaces.

17. In a railway car truck, a side frame having spaced columns and an intervening bolster opening, a bolster extending into said opening, and an interlocking member associated with said side frame and bolster, said interlocking member having wing portions extending along said columns, spaced friction surfaces supported on each column, friction shoes engaging said surfaces, and resilient pads compressed between each wing portion and the adjacent friction shoes.

18. In a railway car truck, relatively movable frame members, spaced friction devices mounted on one of said members, actuating means connected to the other of said members for operation of said friction devices, each of said friction devices comprising spaced friction surfaces, interlaced shoes abutting said surfaces respectively, said actuating means having a part extending between said shoes, and resilient means affording a connection between said shoes and said part.

19. In a railway car truck, relatively movable members, a friction device mounted on one of said members with opposed friction surfaces, interlaced friction shoes having friction faces abutting said surfaces respectively, resilient means urging said shoes into tight engagement with said surfaces, and an actuator fixed in relation to the other of said members and connected between said resilient means for actuation of said shoes.

20. In a railway car truck, relatively movable frame members, spaced friction devices mounted on one of said members, each having opposed friction surfaces, interlaced friction shoes engaging the opposed surfaces in each device, a resilient member associated with each shoe urging it into tight engagement with the associated surface, and an actuator fixed with respect to the other of said members and connected between said resilient means for movement of said shoes against said surfaces.

21. In a railway car truck, relatively movable frame members, spaced friction devices supported on one of said members each comprising opposed friction surfaces, friction shoes in engagement therewith the other of said members having in fixed relation thereto an element resiliently connected to said shoes for actuation thereof, said element having guiding relationship with said device supporting member independently of said friction devices.

22. In a railway car truck, relatively movable members, a friction device mounted on one of said members with opposed friction surfaces, interlaced friction shoes having friction faces abutting said surfaces respectively, resilient means urging said shoes into tight engagement with said surfaces, and an actuator fixed in relation to the other of said members and connected between said resilient means for actuation of said shoes through said means.

23. In a railway car truck, relatively movable frame members, spaced friction devices mounted on one of said members, each having opposed friction surfaces, interlaced friction shoes engaging the opposed surfaces in each device, a resilient member associated with each shoe urging it into tight engagement with the associated surface, and an actuator fixed with respect to the other of said members and connected between said resilient means for movement of said shoes against said surfaces, said actuator having a portion extending between the shoes associated with each device for abutment therewith under certain operating conditions.

24. In a railway car truck, relatively movable frame members, spaced friction devices supported on one of said members, each of said devices having opposed friction surfaces and friction shoes in engagement therewith, a rigid element associated with the other of said members and in guiding relationship with said device supporting member, said element having spaced arms operative to actuate said friction shoes, and resilient means supported from said arms and associated with said shoes.

25. In a railway car truck, relatively movable frame members, spaced friction devices supported on one of said members, each of said devices having opposed friction surfaces, and friction shoes in engagement therewith, a rigid element associated with the other of said members and in guiding relationship with said device supporting member, spaced arms on said element, and resilient means mounted on each of said arms for actuation of the adjacent friction shoes.

26. In a vehicle, relatively movable frame members, spaced friction devices supported on one of said members, each of said devices having opposed diverging friction surfaces engaging friction shoes seated against the respective surfaces of each device, and a rigid element fixed with respect to the other of said members and having guided relationship with said device supporting member independent of said devices, said element having resilient means mounted on opposite ends thereof for actuation of the shoes associated with said respective devices.

27. In a railway car truck, a side frame having spaced columns and an intervening bolster opening, a bolster extending into said opening with guide surfaces engaging said columns and presenting spaced retaining means, friction means spaced on opposite sides of said bolster opening outboard said columns, and operable means for said friction means comprising a member interlocked with said retaining means and having end portions extending longitudinally of said side frame, said friction means comprising spaced friction surfaces supported on each column, friction shoes seated against said friction surfaces, and resilient means interposed between each end portion and the adjacent shoes.

28. In a railway car truck, a side frame having a top member, a bottom member and spaced columns defining a bolster opening, spring means on said bottom member, a bolster end supported on said spring means with guide surfaces engaging said columns, friction devices on said columns, a member interlocked with said bolster end and having wing portions extending along said columns and associated at all times with said friction devices whereby relative movement of said bolster and side frame is frictionally resisted by said devices.

29. In a railway car truck, a side frame having spaced columns and an intervening bolster opening, a bolster extending into said opening, a member extending across the end of said bolster and secured thereto, said member having wing portions extending along said columns, spaced friction surfaces supported outboard each column, friction shoes engaging said surfaces, and resilient pads compressed between each wing portion and the adjacent shoes.

30. In a railway car truck, a side frame having a top member, a bottom member and spaced columns defining a bolster opening, a bolster end supported in said opening, a friction device supported outboard each column, and a bar fixed on said bolster end and extending parallel with said side frame and having operative interengagement with each friction device whereby relative movement of said bolster with respect to said side frame will actuate said friction device.

31. In a railway car truck, a side frame having a top member, a bottom member and spaced columns defining a bolster opening, spring means on said bottom member, a bolster having an end supported on said spring means, friction devices outboard said columns, a member interlocked with said bolster end and having portions extending parallel to said side frame and associated with said friction devices for actuation thereof, each of said friction devices comprising spaced friction surfaces, friction shoes engaging each of said surfaces and resilient means between each shoe and the adjacent portion of said interlocked member.

32. In a railway car truck, a side frame having a top member, a bottom member and spaced columns defining a bolster opening, a bolster end supported in said opening, friction devices outboard each column, and a member secured to said bolster end and extending along said columns for actuation of said friction devices, each of said devices comprising opposed friction surfaces, friction shoes seated against said surfaces, and resilient means interposed between each shoe and the adjacent portion of said last-mentioned member.

33. In a railway car truck, a side frame having top and bottom members and spaced columns defining a bolster opening, a bolster end projecting into said opening in guiding relation with said columns, friction devices mounted outboard of said columns, and operating means fixed on said bolster end with end portions actuating said friction devices, each of said friction devices comprising opposed friction surfaces, a friction shoe seated against each surface, and resilient means compressed between each shoe and the adjacent portion of said operating means.

34. In a railway car truck, a side frame having top and bottom members and spaced columns defining a bolster opening, a bolster end projecting into said opening in guiding relation with said columns, friction devices mounted outboard of said columns, and operating means fixed on said bolster end with end portions actuating said friction devices, each of said friction devices comprising opposed friction surfaces, interlaced friction shoes seated against said surfaces respectively, and resilient means under compression between each friction shoe and the adjacent end portion of said operating means.

ROBERT B. COTTRELL.